UNITED STATES PATENT OFFICE 2,594,309

ANTIMALARIAL AGENTS AND METHOD OF PREPARING THEM

George H. Hitchings and Peter Byrom Russell, Tuckahoe, and Elvira A. Falco, New Rochelle, N. Y., assignors to Burroughs Wellcome & Co. (U. S. A.) Inc., Tuckahoe, N. Y., a corporation of New York No Drawing. Application December 30, 1950, Serial No. 203,791

6 Claims. (Cl. 260—256.4)

This invention relates to new antimalarial agents and to a method of preparing them.

This application is a continuation-in-part of our co-pending application Serial Number 168,156 which describes a novel method for the preparation of certain 4-amino-5-arylpyrimidines. It is a particular object of the present invention to describe a specific class of those substances which have outstanding antimalarial properties. The compounds of the present invention may be represented by the formula

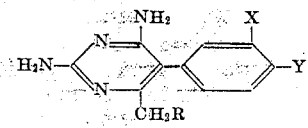

where X is a halogen atom, Y is selected from the class consisting of hydrogen and halogen atoms, and R is selected from the class consisting of hydrogen and alkyl radicals containing 1 to 4 carbon atoms.

The compositions of the present invention are prepared by the condensation of an α-phenyl-β-alkyl-β-alkoxyacrylonitrile with guanidine according to the formulas shown below:

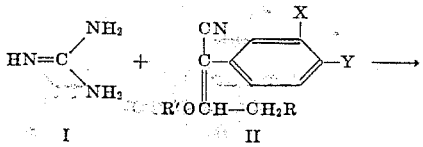

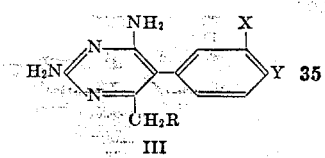

The α-phenyl-β-alkoxy-β-alkylacrylonitriles (II) may be synthesized in the following way: A phenylacetonitrile (V) is prepared from a selected benzyl chloride (IV). This is then acylated by treatment with an acyl ester (VI) in the presence of a basic catalyst such as an alkali alkoxide, giving the corresponding acylnitrile (VII):

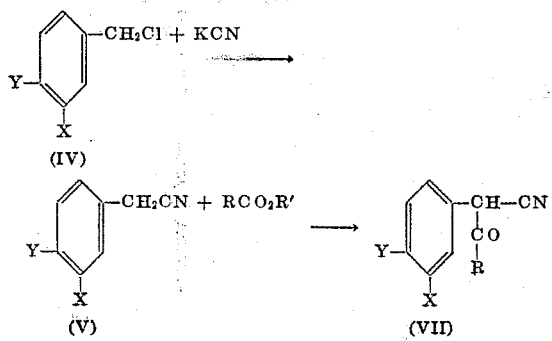

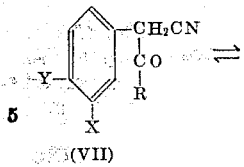

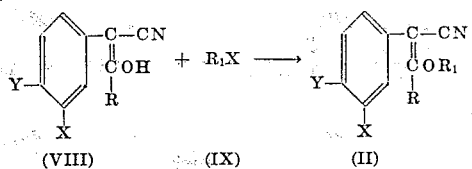

The α-phenyl-α-acylacetonitrile (VII) may also be written in the tautomeric form VIII, which is perhaps best named as an α-phenyl-β-hydroxy-β-alkylacrylonitrile. The substance represented by the formulas VII and VIII on treatment with an alkylating agent, (IX), preferably a diazoalkane or an orthoester, gives the desired α-phenyl-β-alkoxy-β-alkylacrylonitrile (II). The latter as shown above is condensed with guanidine to give the desired pyrimidine. The alkyl radicals R' and R₁ in the formulas above are eliminated in subsequent reactions, moreover various lower alkyl groups behave in the same manner and are regarded as essentially equivalent for the purposes of the present invention.

The following examples illustrate the teachings of the present invention but in no way limit its scope as defined in the claims.

EXAMPLE 1 m-Fluorophenylacetonitrile m-Fluorotoluene (55 g.) was refluxed with sulfuryl chloride (67.5 g.) in the presence of benzoyl peroxide (0.5 g.). When the evolution of hydrogen chloride was complete the oil was washed with water once, then refluxed with potassium cyanide (42 gm.) in ethanol (100 ml.) and water (50 cc.) for 10 hours. The mixture was poured into water, the oil extracted with ether and washed well with water. On distillation it boiled at 124–126°/10 mm., 28 gm.

α-Acetyl-m-fluoroacetonitrile

The above nitrile (13.5 g.) and ethylacetate (8.8 g.) were added to a solution of sodium (2.3 g.) in ethanol (30 cc.). The mixture was heated for 5 hours. The whole was then poured into water, any oily matter removed with ether and the aqueous solution made acid with 1 N H₂SO₄. The ketonitrile separated, and was recrystallized from ether (petroleum ether) as needles M. P. 117–120°.

2,4-diamino-5-m-fluorophenyl-6-methylpyrimidine

The above ketonitrile (7 g.) was treated with diazomethane (from 10 gm. nitrosomethyl urea) in ether. The ether was removed and treated with guanidine (1 mol) in alcohol. After heating on a steam bath for 3 hours the alcohol was evaporated and strong sodium hydroxide was added. The product was filtered off and recrystallized from ethanol-water. M. P. 237–238°, 3.0 gm.

Calc'd for: $C_{11}H_{11}N_4F$. C, 60.5; H, 5.0. Found: C, 60.2; H, 5.2.

EXAMPLE 2

2,4-diamino-5-m-chlorophenyl-6-methylpyrimidine

α-Acetyl-m-chlorophenylacetonitrile (9.7 g.) was reacted with diazomethane to give α-m-chlorophenyl-β-methoxy-β-methyl acrylonitrile. This was then reacted with guanidine (from 4.7 gms. of the hydrochloride) in ethanol. The product was worked up as in the previous examples. After recrystallization from ethanol it melted at 219°–220°.

Calc'd for: $C_{11}H_{11}N_4Cl$: N, 24.1. Found: N, 23.9.

EXAMPLE 3

2,4-diamino-5-m-bromophenyl-6-methylpyrimidine

Prepared from α-acetyl-m-bromophenylacetonitrile as above. On recrystallization from ethanol water it melted at 235°–237°.

EXAMPLE 4

2,4-diamino-5-(3'4'-dichlorophenyl)-6-methylpyrimidine

α-Acetyl-3'4'-dichlorophenylacetonitrile (M. P. 161–163) (11.4 g.) was heated with methylorthoacetate (25 ml.). The low boiling products were removed so long as they continued to be formed. Then the orthoester was removed by distillation in vacuo. The product solidified, on recrystallization from ethanol, it formed plates M. P. 71°–74° ($C_{11}H_9ONCl_2$: Calc'd N, 5.8. Found: N, 6.0). This α-3,4'-dichlorophenyl-β-methoxy-β-methylacrylonitrile was condensed with guanidine (from 4.7 gm. of the hydrochloride) in the usual manner. The diaminopyrimidine separated after 2 hours heating. After crystallization from ethanol it melted at 274°–275°.

Calc'd for $C_{11}H_{10}N_4Cl_2$: N, 20.9. Found: N, 21.2.

EXAMPLE 5

2:4-diamino-5-(3'4' dichlorophenyl)-6-ethylpyrimidine

This compound was prepared as in the previous example. It melted at 229°–232°, after recrystallization from ethanol water.

EXAMPLE 6

2:4-diamino-5-(3'4' dichlorophenyl)-6-n-propyl pyrimidine

As above from α-n-butyryl 3'4' dichlorophenylaceto nitrile (M. P. 101°). After recrystallization from benzene/ligroin mixtures it melted at 174°–176°.

Calc'd for: $C_{13}H_{14}N_4Cl_2$: C, 52.5; H, 4.7; N, 18.9. Found: C, 52.8; H, 6.8; N, 18.11.

EXAMPLE 7

2:4-diamino-5-(3'4' dichlorophenyl)-6-n-butylpyrimidine

Prepared as above from α-n-valeryl-3'4'-dichlorophenyl acetonitrile. It melted at 193°–195°.

Calc'd for: $C_{14}H_{16}N_4Cl_2$: C, 54.1; H, 5.2. Found: C, 53.8; H, 5.0.

EXAMPLE 8

2:4-diamino-5-(3'4' dibromophenyl) 6 ethyl pyrimidine

Was prepared as above from α-propionyl-3'4' dibromophenyl acetonitrile. After recrystallization from alcohol it melted at 250°–252°.

EXAMPLE 9

2:4-diamino-5-(3'-bromo-4'-chlorophenyl) 6-methyl pyrimidine

Prepared in the previously described manner from α-acetyl-3'bromo-4'-chlorophenyl acetonitrile, it melted at 244°–246°.

Since the uncombined base is the physiologically active moiety in any non-toxic salt of the compounds described herein, said non-toxic salts of these derivatives are to be regarded as equivalents of the uncombined bases described in the specification and claims.

We claim:

1. A 2,4-diamino-5-phenyl-6-alkylpyrimidine of the formula

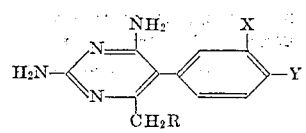

wherein X is a halogen atom, Y is selected from the group consisting of hydrogen and halogen, and R is selected from the class consisting of hydrogen and alkyl radicals containing 1 to 4 carbon atoms.

2. 2,4 - diamino - 5 - (3'4'-dichlorophenyl) - 6-methylpyrimidine.

3. 2,4 - diamino - 5 - (3'4'-dichlorophenyl) - 6-ethylpyrimidine.

4. 2,4 - diamino - 5 - (3'4'-dichlorophenyl) - 6-propylpyrimidine.

5. 2,4 - diamino - 5 - m - chlorophenyl - 6-methylpyrimidine.

6. 2,4 - diamino - 5 - (3'-bromo-4'-chlorophenyl)-6-methyl pyrimidine.

GEORGE H. HITCHINGS.
PETER BYROM RUSSELL.
ELVIRA A. FALCO.

No references cited.